Patented Jan. 2, 1934

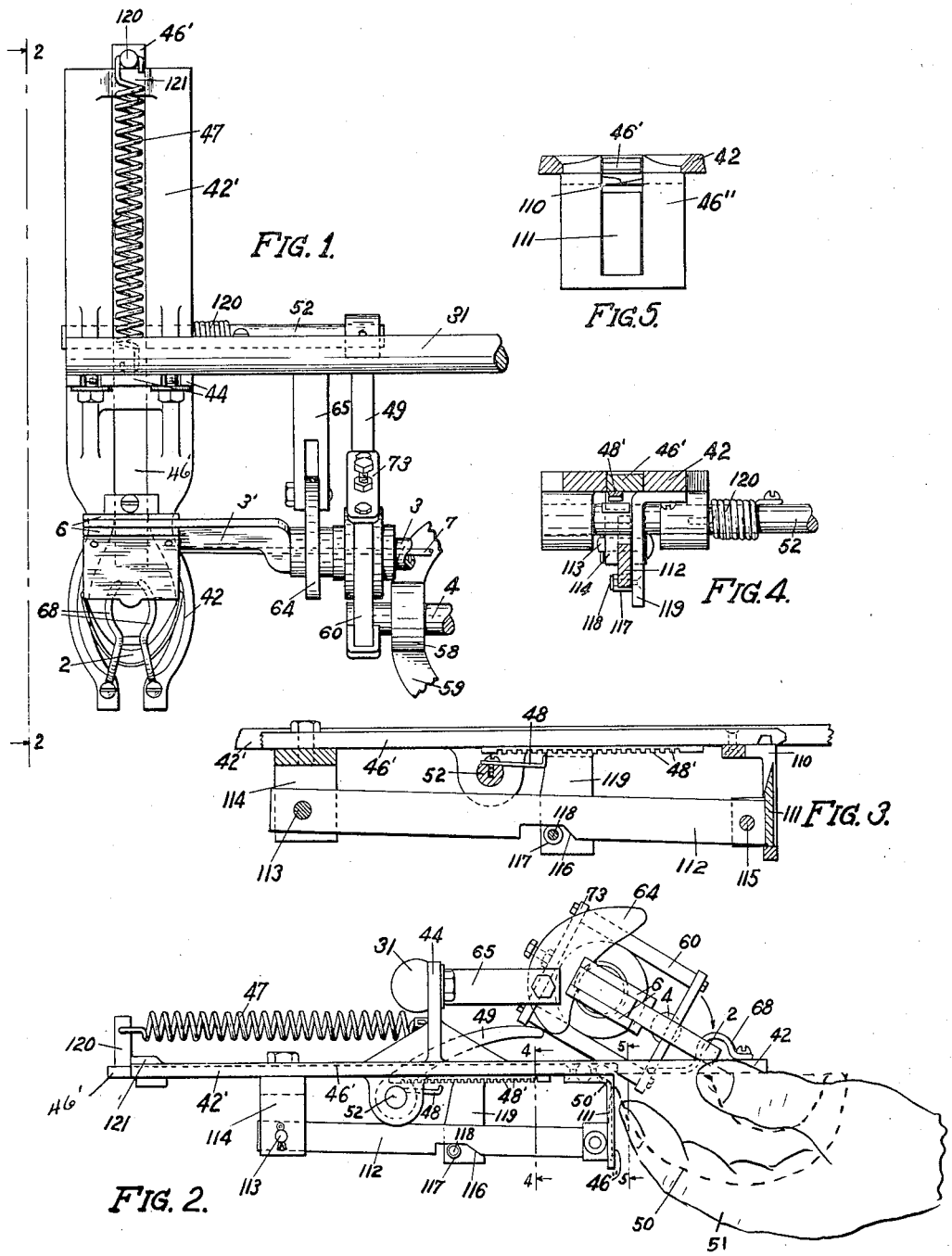

1,941,875

UNITED STATES PATENT OFFICE 1,941,875

PEACH PITTING SUPPORT AND TIP CUTTER

Joseph P. Bem, Oakland, Calif., assignor to Pacific Pitting Machine Company Inc., Fresno, Calif., a corporation of California Application November 5, 1932. Serial No. 641,424

5 Claims. (Cl. 146—28)

This invention relates to fruit pitting machines of the type shown in my copending patent applications filed under Serial Nos. 492,774 and 614,426, and the objects of the invention are to provide a special peach positioning device for a pitting machine which will automatically cut off the bloom tip end of the peach when the fruit is positioned against the device for pitting.

In the drawing accompanying this application Fig. 1 is a plan view of the improved construction with enough of the old construction around it to show its operation.

Fig. 2 is a side elevation of Fig. 1 as seen from the line 2—2 thereof.

Fig. 3 is a longitudinal section of the lower front portion of Fig. 1.

Fig. 4 is a vertical sectional view of a portion of Fig. 2 as seen from the line 4—4 thereof.

Fig. 5 is a front end elevation of the fruit stop and tip cutter as seen from the line 5—5 of Fig. 2.

Since the improvement disclosed in the present invention relates to the fruit positioning device the other parts of the machine already described and claimed in the prior cases mentioned where shown in the present case will be designated with the same numerals used in the copending cases and any new features are herein numbered 110 and upward so as to clearly distinguish over said copending cases generally described and without reference to the drawing, in the type of machine in question there is a heavy pedestal from which projects laterally a supporting arm carrying at its end the fruit locating means adapted for the manual presentation thereagainst of a half fruit such as a half peach, previously made by sawing a peach and its pit in half on another machine, and a yieldingly mounted vibrating arched blade arranged to swing through the half peach thus presented to cut out the half pit, and then swing about a half turn back to starting point for the next peach half.

The present drawing shows the outer portion 31 of the laterally projecting supporting arm, the fruit locating means in the form of a pair of yoke arms 42 extended rearwardly at 42' to form the two long rear guides as previously for the sliding block 46' the forward end of which extends considerably below the guides or yoke arms as shown at 46'' in Fig. 5 in a manner unique to this application to form a vertical guiding slot 110 for a tip cutting blade 111 vertically movable in said slot by reason of being securely mounted at 115 to the outer end of a lever 112 which is loosely pivoted at its rear end at 113 to a small bracket 114 secured to and depending from the under side of the sliding block so as to move horizontally with it.

The arms 42 are secured to the main supporting arm 31 by means of an attaching bracket 44 which is in the present instance cast integral with the arms 42.

The slide 46' is resiliently urged forward by the light coiled tension spring 47 as in the earlier cases to the limit as prescribed by the spring attaching pin 120 striking the upper rear cross piece 121 connecting the extreme rear ends of the arms or guides 42'. The forward end 46'' of the slide 46 stops at a point too far forward for the smallest peach half so that it must be pushed back with the tip end of the peach half to permit centering the fruit under the yoke and curved pitting blade 2, and when thus forcibly pushed back or to the left from position shown in Figs. 2 or 3 by pressure of the peach against it, the tip cutting blade $11_1$ will at once rise and cut off the pointed tip of the peach projecting over the top of the blade. This action is had through the provision of a slanted wall 116 formed on the lever riding over a small roller 117 carried on a pin 118 projecting from a fixed bracket 119.

As in the machines of the copending applications, the arched pitting blade 2 is positioned above the yoke arms 42 and is carried on its carriage 6 at the end of the carrier arm which is revolved by the shaft 4. The blade being arcuately vibrated and free to rise and fall to conform to the pit, and partially controlled by cam 64 and spring, not shown, all by means not involved in the present application though indicated by numbered parts corresponding to and completely described and claimed in the copending applications aforesaid. The pit support 68 of copending case Serial No. 614,426 is also indicated in the present drawing.

When placing a half peach 50 under the yoke by the hand 51 of an operative, and with the tip 50' of the peach projecting over the tip cutter 111, the peach is shoved against the face 46'' of the slide to push it as far as may be required to bring the pit of the fruit in proper place under the arched blade 2 for pitting, and as soon as the blade starts downwardly to revolve and cut out the pit the yoke 60 which bears against a lever arm 49 at the beginning of the stroke, moves away from the lever and the lever swings upwardly a short distance and turns a small shaft 52 which is revolvably supported under arm 31, and thereby throws a sheet metal latch 48 into engagement with a small rack 48' secured to the under side of the slide. This automatic locking of the sliding block at the moment of initial movement of the pitting knife is about the same as shown in the copending applications mentioned, the chief difference being the present use of a spiral spring 120 around the latch shaft 52 tending to revolve the shaft in a direction to engage the latch with the rack and thus hold the sliding block immovable at all times except when the pitting blade is in starting position with its yoke 60 bearing against lever 49 and thus releasing the latch so that the slide is free (except as to the gentle pull of spring 47) for pushing along with the bloom end of the fruit as the fruit is centered by hand for pitting.

Having thus described the improvements as well as sufficient of the parent machine of the copending cases so as to make its operation understood, what I claim is:—

1. In a machine for removing the half-pits from bisected peaches, peach supporting means provided with an under side against which the flat side of the fruit-half is adapted to be held for pitting and having an opening through which the half-pit of the fruit-half is exposed, a curved blade mounted for swinging through the opening in said support for cutting out the half-pit of the fruit, a movable member mounted for sliding along said supporting means and against which the fruit-half is adapted to abut while being positioned against said supporting means for pitting, a tipping blade carried by said movable member arranged to overhang the bloom tip of the fruit-half when the fruit is abutted thereagainst, and means moving said tipping blade to cut off the bloom tip of the fruit-half upon sliding said movable member by pushing thereagainst with the fruit-half.

2. In a structure as specified in claim 1, said slidable member provided with a slotted plate against which the end of the fruit abuts with its tip projecting into the slot, and said tipping blade arranged to operate in said slot.

3. In a structure as specified in claim 1, means automatically restoring said movable member and the tipping blade to original position upon removing the fruit, for successive operation on fruit halves presented thereto.

4. In a construction is specified in claim 1, said movable member comprising an elongated plate, a lever pivotally carried at one end on said plate, and said tipping blade carried at the opposite end of said lever.

5. In a construction as specified in claim 1, said tipping blade arranged to operated upward for chopping off the tip of the fruit substantially against the under side of said movable member.

JOSEPH P. BEM.